(12) United States Patent
Hakamata et al.

(10) Patent No.: US 7,933,638 B2
(45) Date of Patent: Apr. 26, 2011

(54) PORTABLE TERMINAL

(75) Inventors: Koji Hakamata, Shizuoka (JP); Tomoki Katsumata, Kanagawa (JP); Atuhiko Hasigaya, Kanagawa (JP); Shota Teramoto, Kanagawa (JP)

(73) Assignee: Panasonic Corporation, Osaka (JP)

( * ) Notice: Subject to any disclaimer, the term of this patent is extended or adjusted under 35 U.S.C. 154(b) by 640 days.

(21) Appl. No.: 11/996,835

(22) PCT Filed: Jul. 21, 2006

(86) PCT No.: PCT/JP2006/314511
§ 371 (c)(1),
(2), (4) Date: Jan. 25, 2008

(87) PCT Pub. No.: WO2007/013376
PCT Pub. Date: Feb. 1, 2007

(65) Prior Publication Data
US 2010/0144405 A1 Jun. 10, 2010

(30) Foreign Application Priority Data
Jul. 27, 2005 (JP) ................................ 2005-217446

(51) Int. Cl.
*H04M 1/00* (2006.01)
(52) U.S. Cl. ............... 455/575.3; 455/575.1; 455/550.1; 455/566
(58) Field of Classification Search ............... 455/575.3, 455/575.1, 550.1, 566
See application file for complete search history.

(56) References Cited

U.S. PATENT DOCUMENTS

| 7,174,195 | B2 * | 2/2007 | Nagamine | 455/575.1 |
| 7,738,656 | B2 * | 6/2010 | Yoda | 379/433.01 |
| 2005/0079897 | A1 | 4/2005 | Nishijima et al. | |

FOREIGN PATENT DOCUMENTS

| JP | 2004-135118 | 4/2004 |
| JP | 2004-184293 | 7/2004 |
| JP | 2004-274494 | 9/2004 |
| JP | 2004312476 A | 11/2004 |
| JP | 2005-006097 | 1/2005 |
| JP | 2005-078322 | 3/2005 |
| JP | 2005-159391 | 6/2005 |
| JP | 2006-191438 | 7/2006 |

OTHER PUBLICATIONS

International Search Report Dated Aug. 22, 2006.

* cited by examiner

*Primary Examiner* — Nghi H Ly
(74) *Attorney, Agent, or Firm* — Seed IP Law Group PLLC

(57) ABSTRACT

To provide a portable terminal which can detect the using modes of the portable terminal, can reduce the number of members necessary for detecting the using modes and further can reduce leakage magnetic force badly influencing on other devices.

A portable terminal 10 includes a first casing 11 and a second casing 12 having inner side surfaces 11a, 12a capable of opposing to each other, respectively, and a hinge 13 for coupling the first casing 11 and the first casing 11. The first casing 11 is provided with magnetic materials 21, 22a, 22b and the casing 12 is provided with magnetic sensors 24, 25a, 25b for detecting the magnetic materials 21, 22a, 22b, respectively. The magnetic sensors 24, 25a, 25b and the magnetic materials 21, 22a, 22b detect the using modes including a folded state or a bent state of the first casing 11 and the casing 12.

9 Claims, 8 Drawing Sheets

PORTABLE TERMINAL

TECHNICAL FIELD

The present invention relates to a portable terminal which is configured to be foldable by coupling a first casing and a second casing via a hinge.

BACKGROUND ART

As a portable terminal which has a casing provided with a liquid crystal screen and a casing provided with an operation portion capable of performing key input, there has been known one in which the cases are coupled via a hinge and which is carried in a folded state.

According to this portable terminal, the one casing is provided with a magnet and the other casing is provided with a magnetic sensor, and the magnet and the magnetic sensor are disposed in a manner that the magnet is in a detection range of the magnetic sensor in the folded state, whereby the magnetic sensor detects the magnetic field thereby to detect the folded state and an open state.

In recent years, there has been proposed a portable terminal which is configured to be rotatable with respect to two axes. This portable terminal has a casing provided with a liquid crystal screen and a casing provided with an operation portion capable of performing key input, and is configured to protect the liquid crystal screen and to stop the output to the liquid crystal screen thereby to realize low power consumption when the liquid crystal screen and the operation portion are faced to each other and folded.

Further, according to this portable terminal, in an opened state and in a state where the liquid crystal screen and the operation portion are folded in a warped manner, it is possible to view images etc., telephone, browse mails, view and listen moving images on the liquid crystal screen and image by a camera thereof etc.

Among these portable terminals, there is known one in which the two casings are coupled so as to be rotatable freely, an angle detection means detects an angle between the two casings, and an image is displayed on the display portion in accordance with the detection information (see Patent Document 1, for example).

Further, among a digital camera and a portable video camera, there is known one in which a liquid crystal screen housed within a camera main body is supported by a hinge portion so as to be able to be opened and closed freely, and the magnetic sensor of the camera main body detects the magnetic field of the magnet of the hinge portion thereby to detect an angle between the liquid crystal screen and the camera main body (see Patent Document 2, for example).
Patent Document 1: JP-A-2004-135118
Patent Document 2: JP-A-2004-184293

DISCLOSURE OF THE INVENTION

Problems that the Invention is to Solve

The portable terminal described in Patent Document 1 is provided with the angle detection means for detecting the using mode of the portable terminal in the case where the mobile terminal is moved so as to be rotatable freely. According to this system, in the case of e-mailing etc. in a state where the display of the portable terminal is set in an L-shape like a movie style, the key operation while seeing the display screen is facilitated advantageously by changing the display from a longitudinal display to a long-sideway display.

However, there is no concrete disclosure about the method of the angle detection means.

Further, since the camera described in Patent Document 2 differs from the construction of the foldable portable terminal, it is difficult to apply the technique described in Patent Document 2 to the foldable portable terminal. Although the mode detection system using the magnetic sensor of the relate art can be utilized by limiting the modes desired to be detected, the number of each of the magnetic sensors and the magnets is required to be large as the number of the modes desired to be detected increases. That is, supposing that the number of the modes desired to be detected is N, the number of each of the magnetic sensors and the magnets is required to be N−1 in order to detect the N modes without erroneous detection, which results in the complication of a circuit and control and the increase of cost due to the increase of the number of parts.

In contrast, although the technique of using a Hall element as the magnetic sensor has been known, the general Hall sensor is configured to detect magnetic field in the vertical direction with respect to a mounting board. Thus, the direction of the magnet is adjusted so as to apply the magnetic field in the vertical direction with respect to the mounting board in the folded state.

According to this configuration, since the leakage magnetic force from the surface of the casing of the terminal becomes large in accordance with the thinning of the portable terminal in recent years, there arises a problem that other devices are badly influenced such that the recording data of a magnetic card is made erroneous.

The invention is made in order to solve the problems of the aforesaid related art and intends to design the arrangements and controls of magnetic sensors and magnets so as to be able to detect many using modes in a portable terminal with smaller numbers of the magnetic sensors and the magnets than those of the related art (concretely, five modes can be detected with three magnetic sensors and three magnets) thereby to simplify a circuit and a control, realize miniaturization and prevent a cost-up.

Means for Solving the Problems

A portable terminal according to the invention includes:
a first casing and a second casing which have inner side surfaces capable of opposing to each other, respectively; and
a hinge which has a first axis substantially in parallel to the inner side surfaces of the first casing and the second casing and a second axis orthogonal to the first axis, and couples the first casing and the second casing,
wherein the hinge is arranged such that the first casing and the second casing are relatively rotatable around first axis from a folded state where the inner side surfaces of the first casing and the second casing are relatively approached to each other to an opened state where the inner side surfaces of the first casing and the second casing are relatively separated,
in each of the folded state and a bent state in which the inner side surfaces of the first casing and the second casing are disposed substantially in parallel to each other, the first casing and the second casing are made rotatable relatively around the second axis,
using modes including the folded state and the bent state of the first casing and the second casing are detected by using a magnetic material which is provided at one of the first casing and the second casing and a magnetic sensor which detects the magnetic material and is provided at the other of the first casing and the second casing.

According to the invention thus configured, the magnetic material provided at one of the first casing and the second casing is detected by the magnetic sensor provided at the other of the first and second casings, whereby the using modes of the portable terminal including the folded state or the bent state of the first and second casings are detected.

Thus, according to the invention, the various using modes of the portable terminal can be detected and the number of members and a cost necessary for detecting the using modes of the portable terminal can be reduced.

Further, the invention is characterized in that the magnetic material and the magnetic sensor are disposed on a circumference with the same radius around the second axis.

According to the invention thus configured, since the magnetic material and the magnetic sensor are disposed on the circumference with the same radius around the second axis, the relative positions of the first and second casings can be detected accurately when the first and second casings are rotated relatively around the second axis.

Further, the invention is characterized in that the magnetic material and the magnetic sensor are disposed at positions symmetrical with respect to the first axis.

According to the invention thus configured, since the magnetic material and the magnetic sensor are disposed at positions symmetrical with respect to the first axis, the bent state of the first and second casings can be detected accurately when the first and second casings are bent relatively around the second axis.

Further, the invention is characterized in that a plurality of the magnetic sensors are provided at the one of the first casing and the second casing, the respective magnetic sensors are disposed at symmetrical positions with respect to a center line on a plane which is orthogonal to the first axis and along which an axis line of the second axis extends, and the using mode is determined based on relative positions of the first casing and the second casing when one of the magnetic sensors detects the magnetic material.

According to the invention thus configured, since a plurality of the magnetic sensors are provided at the one of the first casing and the second casing, many using modes can be detected accurately when the first and second casings are rotated relatively around the second axis.

Further, the invention is characterized in that a plurality of the magnetic materials are provided at one of the first casing and the second casing, and the respective magnetic materials are disposed at symmetrical positions with respect to the center line.

According to the invention thus configured, since a plurality of the magnetic materials are provided at one of the first casing and the second casing so as to be disposed at symmetrical positions with respect to the center line, when the first casing and the second casing are rotated relatively around the second axis, the bent state of 90 degree can be accurately detected and also many using modes can be detected.

In this case, it is particularly preferable to dispose each of the magnetic materials so as to separate from the center line and not to be located on the circumference.

According to this configuration, the folded state of the first casing and the second casing can be accurately detected and also many using modes can be detected.

Further, the invention is characterized in that one of the first casing and the second casing is provided with a display portion which displays an image and a control portion which controls the display portion, and the control portion changes a vertical direction of an image on the display portion so as to cope with the using mode thus determined.

According to the invention thus configured, since the control portion changes the vertical direction of an image on the display portion in accordance with the using mode detected by the magnetic sensor, the visibility of an image for a user can be improved.

Further, the invention is characterized in that in a case where the magnetic sensors output values different from setting values set in advance, the control portion performs a control similar to one of the respective using modes corresponding to the setting values.

Further, the invention is characterized in that in a case where the magnetic sensors output values different from setting values set in advance, the control portion continues at least part of a control performed just before the detection of the output values.

According to these inventions thus configured, in the case where the magnetic sensors output values different from the setting values set in advance, the control portion performs the control similar to that of at least one of the using modes or the control portion continues at least a part of the control performed just before the detection of the output values. Thus, the invention can cope with an unfinished folded state and rotation state, the detection of abnormality of the magnetic material or a failure of the magnetic material or the magnetic sensor, etc.

Further, the invention is characterized in that one of the first casing and the second casing is provided with an antenna, and the control portion changes characteristics relating to signal reception of the antenna in accordance with the using mode.

According to the invention thus configured, since the control portion changes the characteristics relating to the signal reception of the antenna in accordance with the using mode, in other words, the direction of the antenna, the signal receiving performance of the antenna can be improved.

Further, the invention is characterized in that one of the first casing and the second casing is provided with a control portion which controls signal reception of television broadcast, and the control portion activates an application for receiving the television broadcast in accordance with the using mode.

According to the invention thus configured, since the control portion activates the application for receiving the television broadcast in accordance with the using mode detected by the magnetic sensor, the usability for a user can be improved since the application for receiving the television broadcast can be activated in accordance with the using mode.

Further, the invention is characterized in that one of the first casing and the second casing is provided with a control portion which controls reproduction of an image, and the control portion activates an application for reproducing an image in accordance with the using mode.

According to the invention thus configured, since the control portion activates the application for reproducing an image in accordance with the using mode detected by the magnetic sensor, the usability for a user can be improved since the application for reproducing an image can be activated in accordance with the using mode.

Further, the invention is characterized in that the magnetic material is a magnet.

According to the invention thus configured, since the magnetic material is configured by the magnet, the reduction of the cost and the weight of the portable terminal can be realized.

Further, the invention is characterized in that the magnetic sensor is an MR sensor.

According to the invention thus configured, since the magnetic sensor is configured by the MR sensor, the reduction of the cost and the weight of the portable terminal can be realized and also the leakage magnetic force badly influencing on other devices can be reduced.

Effects of the Invention

According to the invention, the various using modes of the portable terminal are detected by the magnetic sensor and the magnetic material, the using modes of the portable terminal can be detected, and the number of members necessary for detecting the using modes can be detected and further leakage magnetic force badly influencing on other devices can be reduced advantageously.

Figure 1:
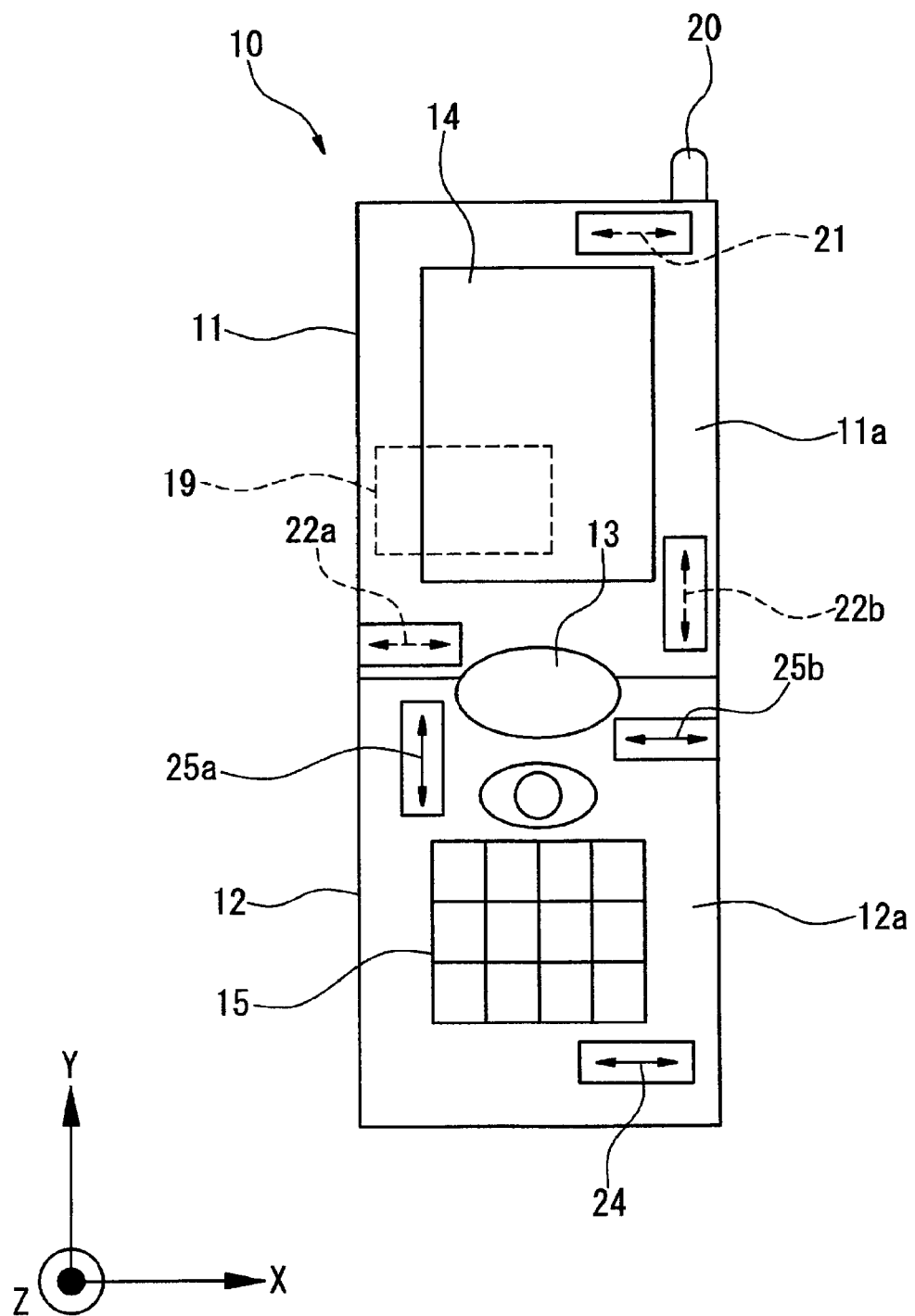
FIG. 1 is a front view showing the opened state of the portable terminal according to the invention.

DESCRIPTION OF REFERENCE NUMERALS 10 portable terminal
11 first casing
11a inner side surface of first casing
12 second casing
12a inner side surface of second casing
13 hinge
14 display portion
17 first axis
18 second axis
19 control portion
20 antenna
21, 22a, 22b magnetic material
24, 25a, 25b magnetic sensor
27 circumference around second axis

BEST MODE FOR CARRYING OUT THE INVENTION

Hereinafter a portable terminal according to embodiments of the invention will be explained with reference to drawings.

Figure 2:
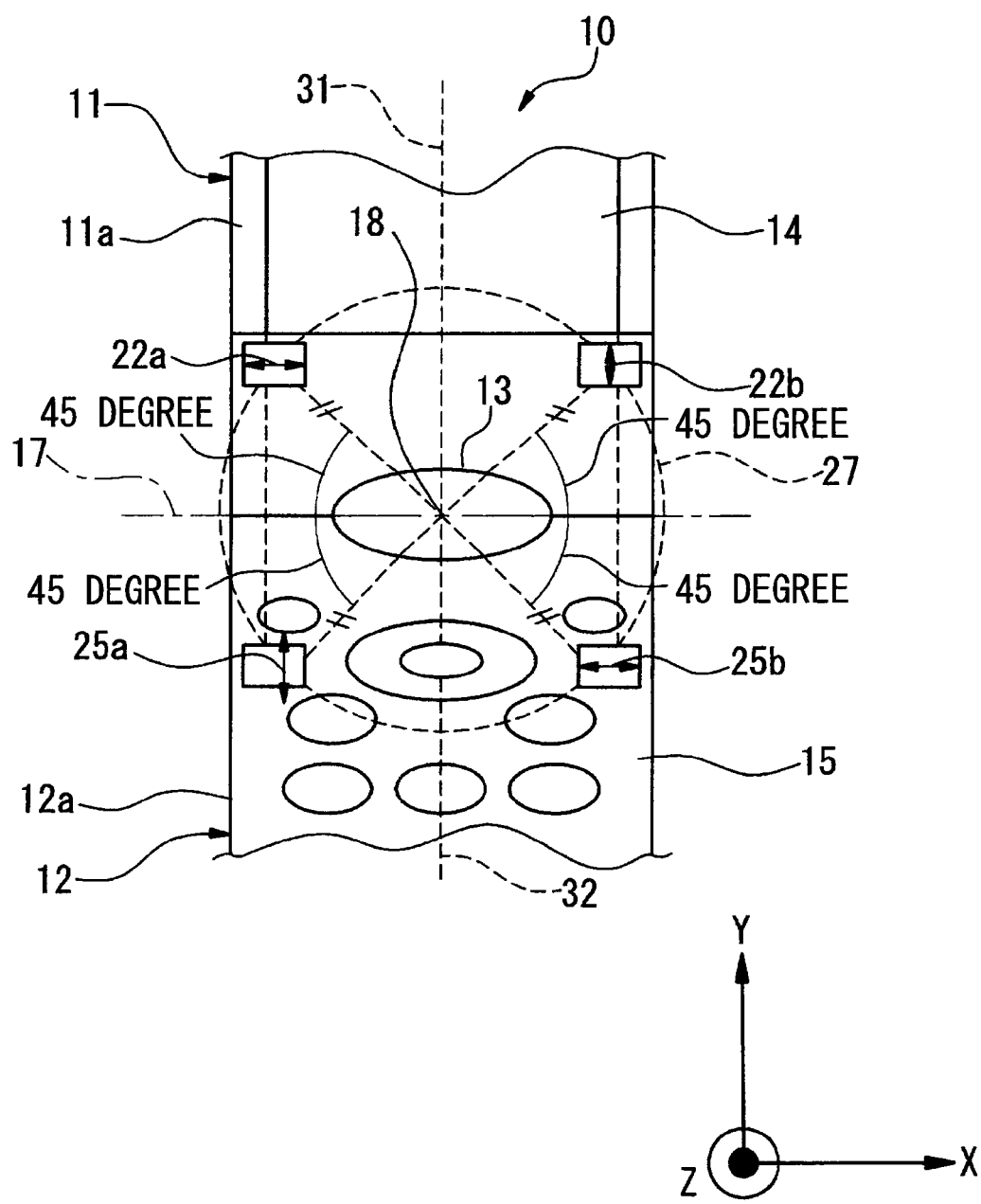
FIG. 2 is an enlarged diagram showing a main portion of the portable terminal according to the invention.

A portable terminal 10 according to the first embodiment shown in FIGS. 1 and 2 includes a first casing 11 and a second casing 12 capable of opposing to each other in a folded state and a hinge 13 for coupling the first casing 11 and the second casing 12.

The first casing 11 is formed in an almost rectangular shape and includes a display portion 14 on an inner side surface 11a thereof. Although a liquid crystal screen is employed as an example of the display portion 14, another unit other than the liquid crystal screen may be employed.

The second casing 12 is formed in an almost rectangular shape and is provided on an inner side surface 12a thereof with an operation portion 15 capable of performing a key input and the operation of a controller.

The inner side surface 11a of the first casing 11 and the inner side surface 12a of the second casing 12 oppose to each other in a state where the first casing 11 and the second casing 12 are folded.

The hinge 13 includes a first axis 17 and a second axis 18 which lie at right angles to each other. The first casing 11 and the second casing 12 are coupled by the first axis 17 and the second axis 18 so as to be rotatable freely.

The first axis 17 is an axis in parallel to an X-axis among the X-axis, a Y-axis and a Z-axis shown in FIG. 2. The second axis 18 is an axis in parallel to the Z-axis among the X-axis, the Y-axis and the Z-axis shown in FIG. 2.

A first center line 31 and a second centerline 32 shown in FIG. 2 are orthogonal to the first axis 17 and are set on the same plane along the axis line of the second axis 18.

The hinge 13 is configured in a manner that the first casing 11 and the second casing 12 are rotatable relatively around the first axis 17 from the folded state where the inner side surfaces 11a and 12a are relatively approached to each other to an opened state where both the inner side surfaces are separated.

Further, the hinge 13 is configured in a manner that the first casing 11 and the second casing 12 are rotatable relatively around the second axis 18 in the folded state where the inner side surfaces 11a and 12a are disposed in parallel to each other and in a bent state.

By the provision of the hinge 13, the portable terminal 10 can be set to five using modes such as the folded state, the bent state and the opened state. The five using modes will be explained with reference to (A) to (E) of FIG. 3.

Figure 3:
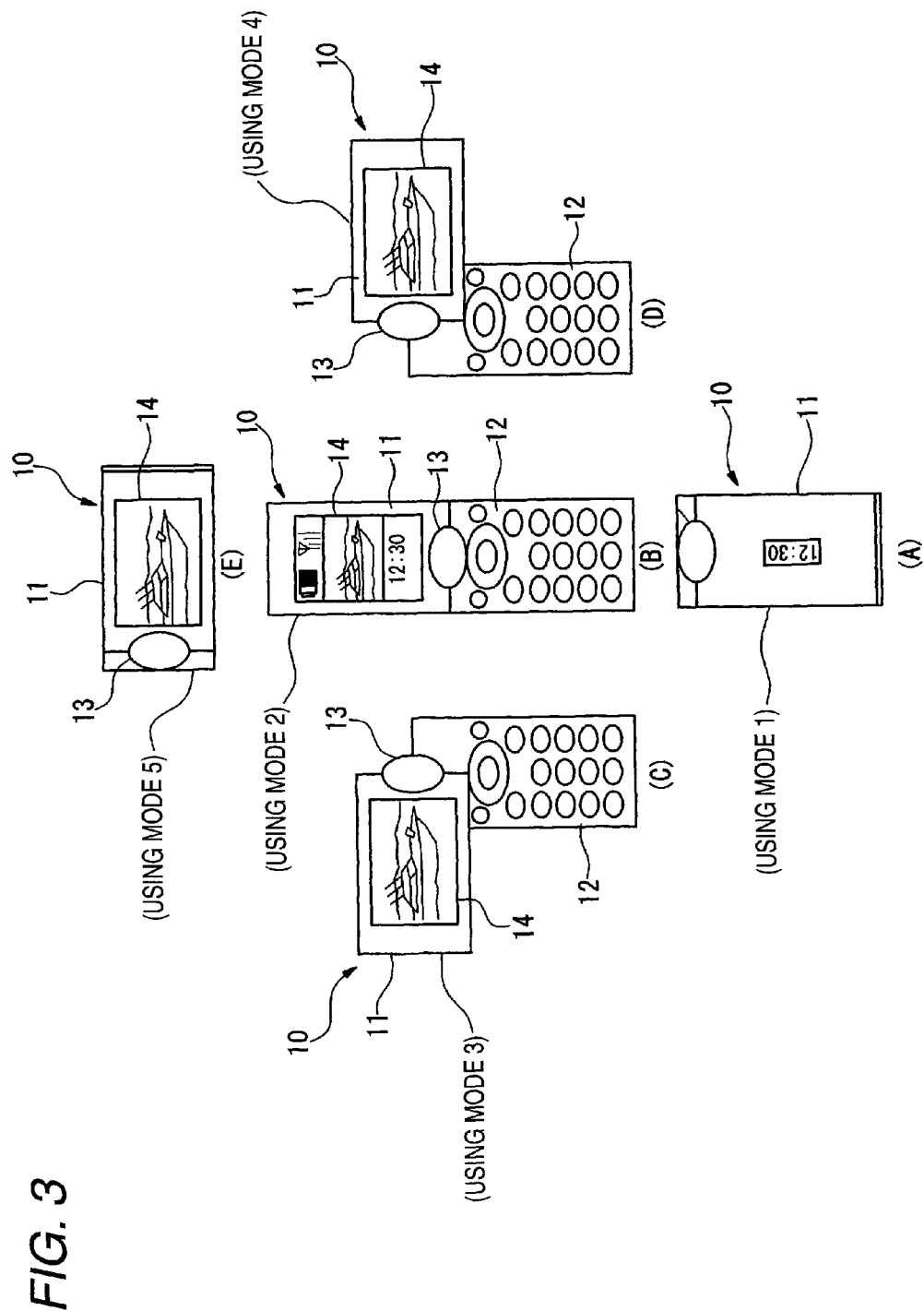
FIG. 3 is a diagram for explaining the using modes of the portable terminal according to the invention.

A using mode 1 of (A) of FIG. 3 represents the folded state (closed state) which is a using mode in the case of protecting the display portion 14 and stopping the display of the display portion 14.

A using mode 2 of (B) of FIG. 3 represents the opened state which is a using mode in the case of confirming the reception of a call and a mail.

Each of a using mode 3 of (C) of FIG. 3 and a using mode 4 of (D) of FIG. 3 represents the bent state where the first casing 11 having the display portion 14 is rotated by 90 degree around the first axis 17 with respect to the second casing 12 and so is bent from the using mode 2, which is a using mode in the case of viewing and listening an image etc.

The using mode 3 of (C) of FIG. 3 represents a state bent to the left by 90 degree and a using mode 4 of (D) of FIG. 3 represents a state bent to the right by 90 degree.

A using mode 5 of (E) of FIG. 3 represents a state where the casings are folded in an opposite direction to the using mode 2. In other words, this using mode represents a screen-inversed closed state in which the first casing 11 and the second casing 12 are relatively rotated by 180 degree around the first axis 17 from the using mode 2 thereby to direct the display portion 14 outward, which is a using mode in the case of using the portable terminal 10 like a digital still camera.

Further, as shown in FIG. 1, the portable terminal 10 also includes a control portion 19 for controlling the portable terminal 10, an antenna 20 for receiving radio wave, a circuit relating to the antenna 20, a member for realizing a telephone communication and data communication using radio wave, and a member for photographing a subject to be photographed, etc.

The portable terminal 10 further includes three magnetic materials 21, 22a, 22b at the first casing 11 of the first casing 11 and the second casing 12 and includes three magnetic sensors 24, 25a, 25b at the second casing 12 for detecting the magnetic materials 21, 22a, 22b, respectively.

The magnetic sensors 24, 25a, 25b and the magnetic materials 21, 22a, 22b detect the using modes including the folded state and the bent state of the first casing 11 and the second casing 12.

Although the magnets are used as an example as the magnetic materials 21, 22a, 22b, for example, another material other than the magnet may be employed.

Further, although an MR sensor which is configured by an IC (integrated circuit) and outputs a voltage according to magnetic field applied thereto is used as each of the magnetic sensors 24, 25a, 25b, the magnetic sensor may be a sensor for detecting the magnetic field in the direction along the XY plane.

The magnetic materials 21, 22a, 22b generate magnetic forces in arrowed directions shown by broken lines in FIGS. 1 and 2.

The magnetic sensors 24, 25a, 25b are configured to direct the magnetic filed detection directions thereof to the arrowed directions shown by steady lines in FIGS. 1 and 2.

The magnetic materials 21, 22a, 22b and the magnetic sensors 24, 25a, 25b are disposed on the XY plane of the X-axis, Y-axis and Z-axis shown in FIG. 2, that is, a plane in parallel to substrates (not shown) within the first casing 11 and the second casing 12.

As shown in FIG. 2, the magnetic material 22a and the magnetic sensor 25a are disposed on a circumference 27 of the same radius around the second axis 18, and the magnetic material 22a and the magnetic sensor 25a are disposed at symmetric positions with respect to the first axis 17.

Further, the magnetic material 21 and the magnetic sensor 24 are disposed on the first casing 11 and the second casing 12 respectively so as to be overlapped to each other when seen from the Z-direction in the case of the using mode 1 shown in (A) of FIG. 3.

The magnetic material 21 is disposed on the end portion side of the first casing 11 which position is away from the first axis 17 and the second axis 18 and not located on the circumference 27.

The magnetic sensor 24 is disposed on the end portion side of the second casing 12 which position is away from the first axis 17 and the second axis 18 and not located on the circumference 27.

Since the magnetic material 21 and the magnetic sensor 24 are provided, in the case of folding the first casing 11 and the second casing 12 around the first axis 17, the folded sate can be detected accurately and many using modes can be detected.

The another magnetic material 22b is disposed at the first casing 11 where the magnetic material 22a is disposed so that this magnetic material and the magnetic material 22a are symmetrical with respect to the first center line 31.

Further, another magnetic sensor 25b is disposed at the second casing 12 where the magnetic sensor 25a is disposed so that this magnetic sensor and the magnetic sensor 25a are symmetrical with respect to the second center line 32.

The first center line 31 is a center line of the first casing 11 and the second center line 32 is a center line on the second casing 12 side. The first center line 31 and the second center line 32 are orthogonal to the first axis 13 and locate on the same line.

In FIG. 2, the first center line 31 and the second center line 32 are in parallel to the Y-axis.

The magnetic materials 22a, 22b and the magnetic sensors 25a, 25b are positioned in the following manner in order to detect the using modes 1 to 5 shown in FIG. 3.

That is, the magnetic material 22a and the magnetic material 22b are disposed at positions along the circumference 27 in the upper direction by 45 degree from the first axis 17.

The magnetic material 22a and the magnetic material 22b are disposed within the first casing 11 so that the directions of the magnetic fields thereof are in parallel to the XY plane and are shifted by 90 degree therebetween.

The magnetic sensor 25a and the magnetic sensor 25b are disposed at positions along the circumference 27 in the lower direction by 45 degree from the first axis 17.

The magnetic sensor 25a and the magnetic sensor 25b are disposed within the second casing 12 so that the directions of the magnetic fields detected thereby are in parallel to the XY plane and are shifted by 90 degree therebetween.

Figure 4:
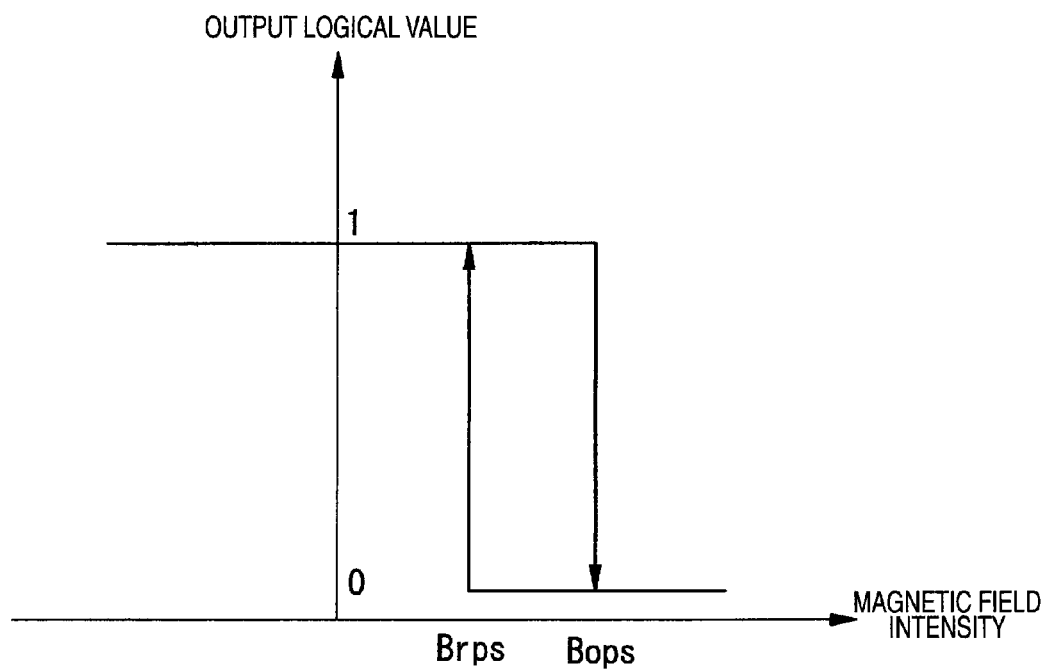
FIG. 4 is a graph showing the output logical characteristics with respect to magnetic flux intensity applied to the magnetic sensors.

FIG. 4 is a graph showing the output logical characteristics with respect to the magnetic flux intensity (magnetic field intensity) detected by the magnetic sensors 24, 25a, 25b.

Predetermined values brps and bops represent magnetic field intensities, wherein the brps is smaller than the bops.

The explanation will be made based on the graph shown in FIG. 4 and FIGS. 1 and 2 as to output logical values when the magnetic fields applied to the magnetic sensors 24, 25a, 25b change.

The direction of the magnetic field detected by each of the magnetic sensors 24, 25a, 25b is in parallel to the plane of the substrate on which the own sensor is mounted. Further, the magnetic field to be detected does not depend on the polarity, that is, N pole and S pole. The output logical value of the magnetic sensor is 0 when it is detected that the intensity of the magnetic field directed to the prescribed direction is equal to the predetermined value bops or more.

The output logical value of the magnetic sensor 10 is 0 until a state where the magnetic field intensity exceeds the predetermined value brps from the state where the magnetic field intensity is bops or more. Further, the output logical value becomes 1 when each of the magnetic sensors 24, 25a, 25b detects that the magnetic field intensity is bops or less.

The explanation will be made as the output logical value when the magnetic filed applied to the magnetic sensors 24, 25a, 25b changes.

The direction of the magnetic field detected by each of the magnetic sensors 24, 25a, 25b is in parallel to the plane of the substrate on which the own sensor is mounted. Further, the magnetic field to be detected does not depend on the polarity, that is, N pole and S pole. The output logical value of the magnetic sensor is 0 when it is detected that the intensity of the magnetic field directed to the prescribed direction is equal to the predetermined value bops or more.

Further, the output logical value of the magnetic sensor 10 is 0 until the state where the magnetic field intensity exceeds the predetermined value brps from the state where the magnetic field intensity is bops or more. Further, the output logical value becomes 1 when the magnetic sensor detects that the magnetic field intensity is bops or less.

The portable terminal 10 includes the three magnetic sensors 24, 25a, 25b. Thus, when the output logical value of the magnetic sensors 24, 25a, 25b are treated as signals and these signals are aligned in the order of the magnetic sensors 24, 25a, 25b, these signal can be treated as a three-bit digital signal.

For example, when the magnetic sensors 24, 25a, 25b detect the magnetic field, since the output logical value of each of the magnetic sensors becomes 0, the signal is "000" when represented by three bits.

Further, when only the magnetic sensor 25a detects the magnetic field, the signal is "101".

Furthermore, when none of the magnetic sensors 24, 25a, 25b detect the magnetic field, the signal is "111".

In this manner, in theory, eight states can be specified from the three-bit signal outputted from the magnetic sensors 24, 25a, 25b.

The five using modes of the portable terminal 10 shown in FIG. 3 are specified by employing this method.

Next, the operation of the portable terminal 10 will be explained based on FIGS. 5 to 10.

Figure 5:
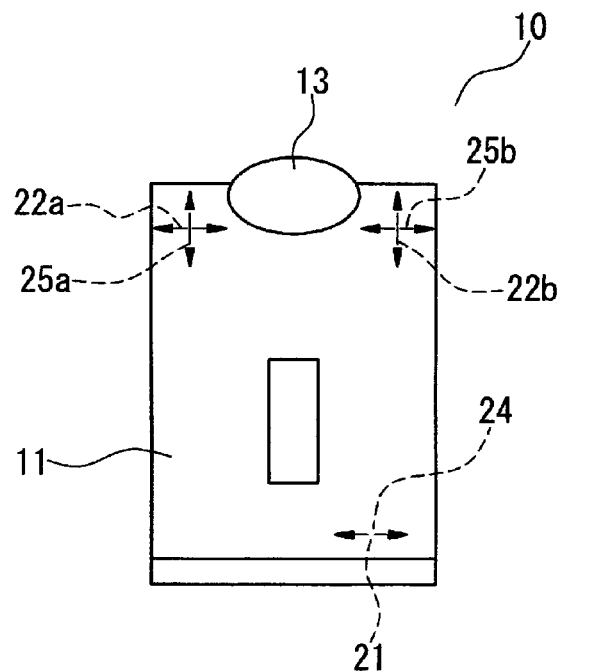
FIG. 5 is a diagram for explaining the positional relation between the magnetic materials and the magnetic sensors in the using mode 1 of the portable terminal according to the invention.
Figure 6:
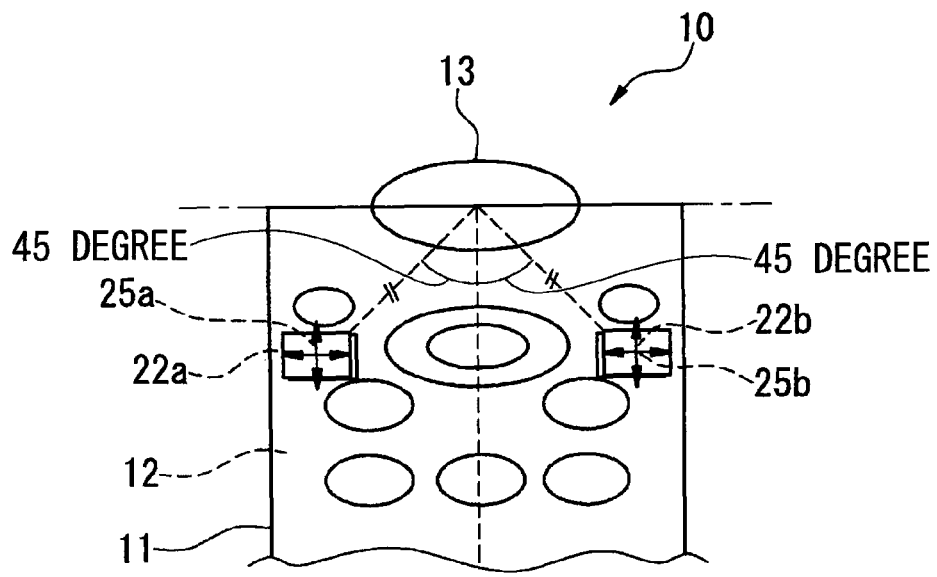
FIG. 6 is an enlarged diagram of a main portion in which the periphery of a hinge of FIG. 5 is shown in an enlarged manner.

FIG. 5 is a diagram for explaining the positional relation between the magnetic materials and the magnetic sensors in the using mode 1, and FIG. 6 is an enlarged diagram of a main portion in which the periphery of the hinge of FIG. 5 is shown in an enlarged manner.

As shown in FIGS. 5 and 6, in the using mode 1, the magnetic material 21 is disposed relative to the magnetic sensor 24 in a manner that the magnetic material is directed so that the magnetic sensor 24 can detect the magnetic field and is distanced from the magnetic material so that the magnetic sensor is applied with a detectable magnetic field intensity.

As to the magnetic sensors 25a, 25b, the magnetic materials 22a, 22b are disposed in the directions deviated by 90 degree from the magnetic field detection directions of the magnetic sensors 25a, 25b, respectively.

Thus, the three-bit output signal outputted from the magnetic sensors 24, 25a, 25b is "011".

Figure 7:
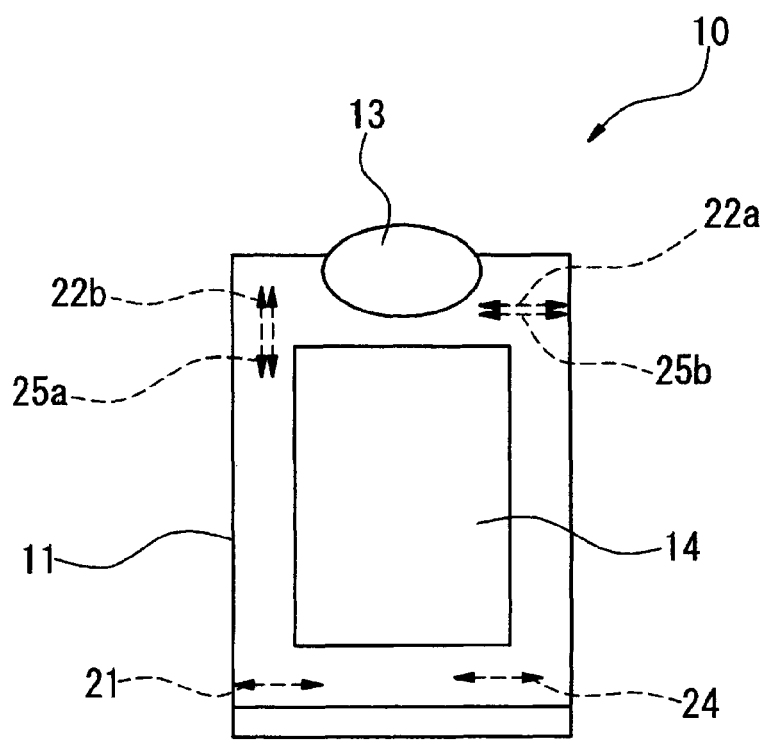
FIG. 7 is a diagram for explaining the positional relation between the magnetic materials and the magnetic sensors in the using mode 5 of the portable terminal according to the invention.
Figure 8:
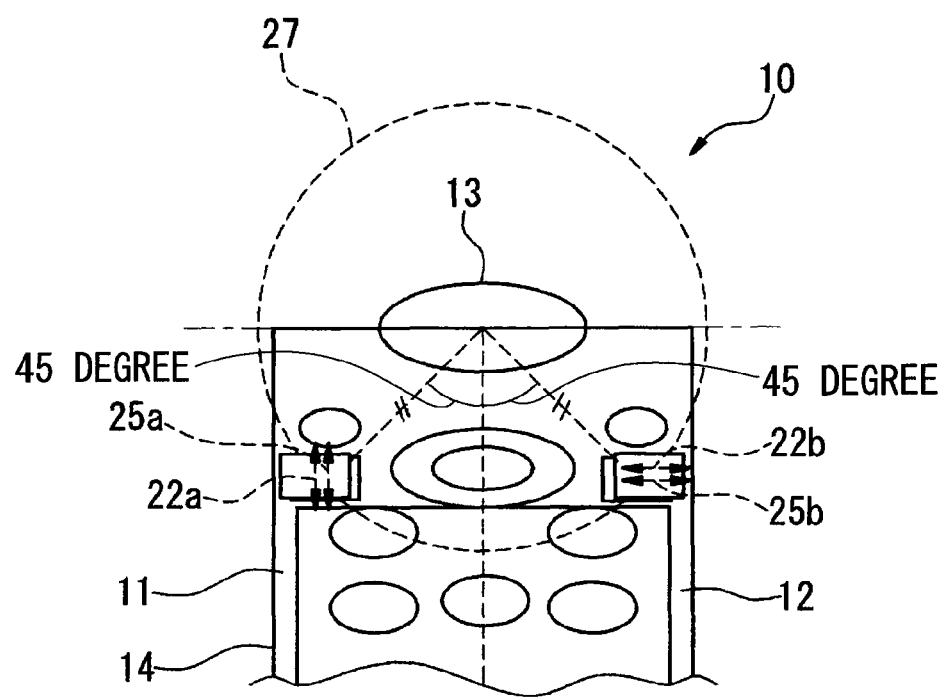
FIG. 8 is an enlarged diagram of a main portion in which the periphery of the hinge of FIG. 7 is shown in an enlarged manner.

FIG. 7 is a diagram for explaining the positional relation between the magnetic materials and the magnetic sensors in the using mode 5, and FIG. 8 is an enlarged diagram of a main portion in which the periphery of the hinge of FIG. 7 is shown in an enlarged manner.

As shown in FIGS. 7 and 8, in the using mode 5, the magnetic material 21 is disposed at a position separate from the magnetic sensor 24. According to this distance between the magnetic sensor and the magnetic material, since the intensity of the magnetic filed applied to the magnetic sensor 24 from the magnetic material 21 is small, the magnetic sensor 24 can not detect the magnetic field.

On the other hand, the magnetic materials 22a, 22b are disposed relative to the magnetic sensors 25a, 25b in a manner that the magnetic materials are directed so that the magnetic sensors 25a, 25b can detect the magnetic fields and are distanced from the magnetic materials so that the magnetic sensors are applied with detectable magnetic field intensities, respectively.

Thus, the three-bit output signal outputted from the magnetic sensors 24, 25a, 25b is "100".

Figure 9:
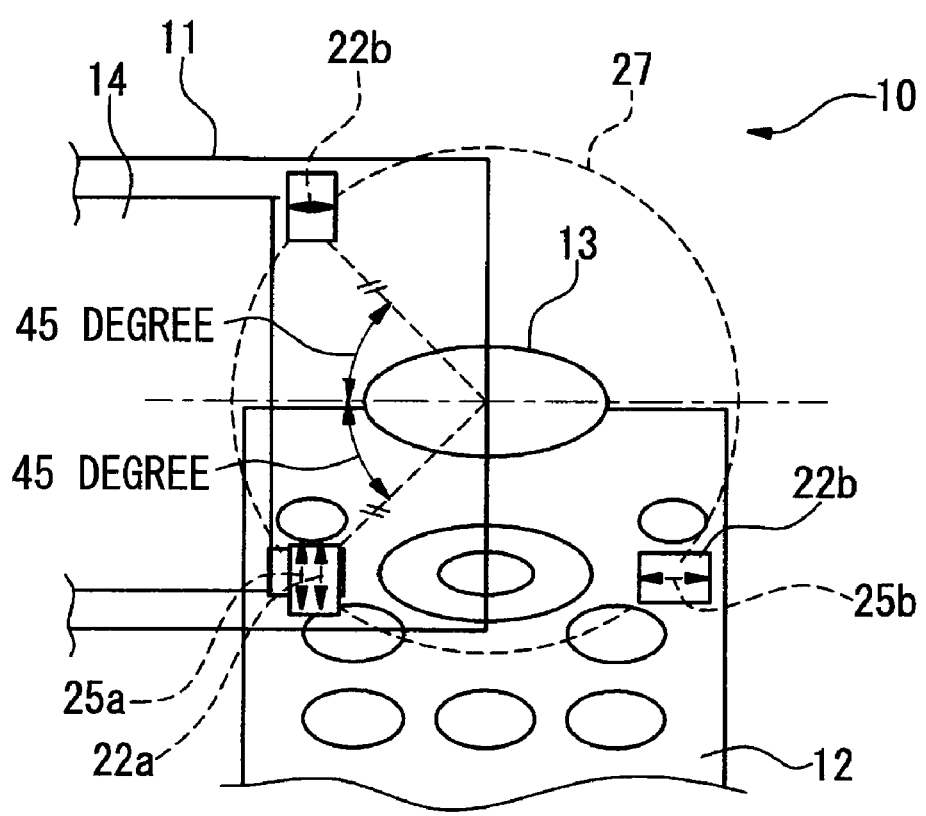
FIG. 9 is a diagram for explaining the positional relation between the magnetic materials and the magnetic sensors in the using mode 3 of the portable terminal according to the invention.

FIG. 9 is a diagram for explaining the positional relation between the magnetic material and the magnetic sensor in the using mode 3 and is an enlarged diagram of a main portion in which the periphery of the hinge is shown in an enlarged manner.

As shown in FIG. 9, in the using mode 3, the magnetic materials 21, 22b are disposed at positions separate from the magnetic sensors 24, 25b, respectively. According to this distances between the magnetic sensors and the magnetic materials, since the intensities of the magnetic filed applied to the magnetic sensors 24, 25b from the magnetic materials 21, 22b are quite small, respectively, each of the magnetic sensors 24, 25b can not detect the magnetic field.

On the other hand, the magnetic material 22a is disposed relative to the magnetic sensor 25a in a manner that the magnetic material is directed so that the magnetic sensor 25a can detect the magnetic field and is distanced from the magnetic material so that the magnetic sensor is applied with a detectable magnetic field intensity.

Thus, the three-bit output signal outputted from the magnetic sensors 24, 25a, 25b is "101".

Figure 10:
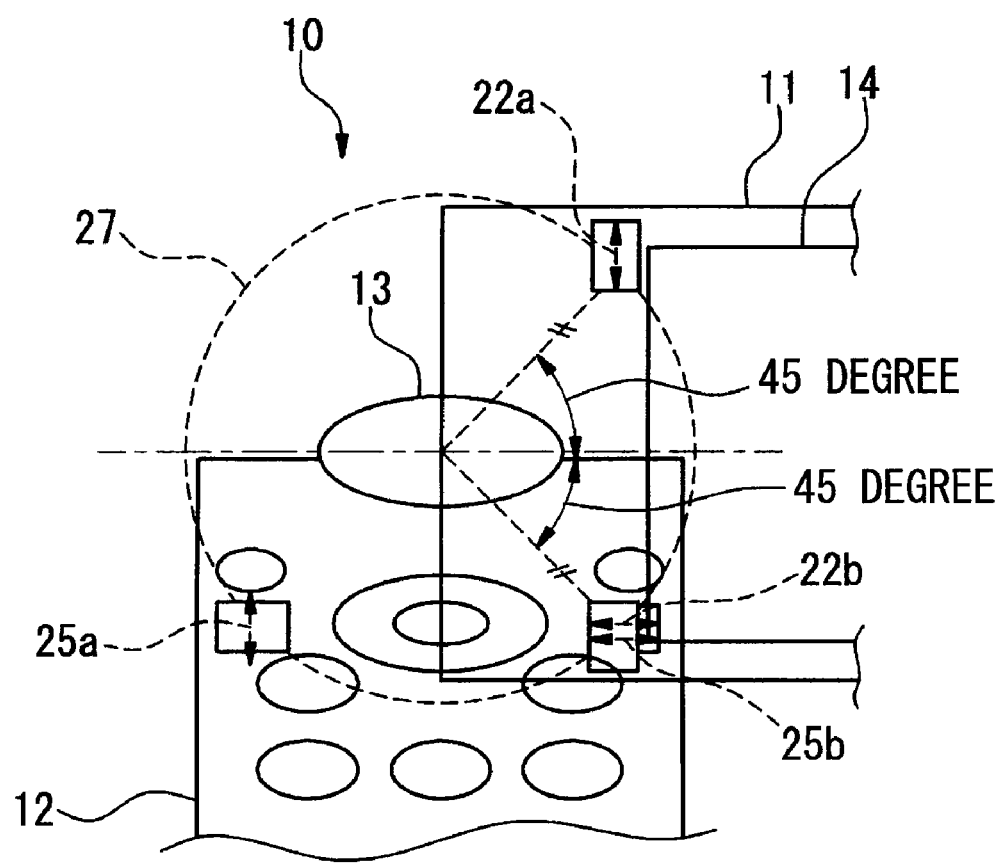
FIG. 10 is a diagram for explaining the positional relation between the magnetic materials and the magnetic sensors in the using mode 4 of the portable terminal according to the invention.

FIG. 10 is a diagram for explaining the positional relation between the magnetic material and the magnetic sensor in the using mode 4 and is an enlarged diagram of a main portion in which the periphery of the hinge is shown in an enlarged manner.

As shown in FIG. 10, in the using mode 4, the magnetic materials 21, 22a are disposed at positions separate from the magnetic sensors 24, 25a, respectively. According to this distances between the magnetic sensors and the magnetic materials, since the intensities of the magnetic filed applied to the magnetic sensors 24, 25a from the magnetic materials 21, 22a are quite small, respectively, each of the magnetic sensors 24, 25a can not detect the magnetic field.

On the other hand, the magnetic material 22b is disposed relative to the magnetic sensor 25b in a manner that the magnetic material is directed so that the magnetic sensor 25b can detect the magnetic field and is distanced from the magnetic material so that the magnetic sensor is applied with a detectable magnetic field intensity.

Thus, the three-bit output signal outputted from the magnetic sensors 24, 25a, 25b is "110".

In the using mode 2 shown in (B) of FIG. 3, all the magnetic sensors 24, 25a, 25b are disposed so as to be separated from the magnetic materials 21, 22a, 22b, respectively. Thus, none of the magnetic sensors 24, 25a, 25b detect the magnetic fields from the magnetic materials 21, 22a, 22b, respectively.

Thus, the three-bit output signal outputted from the magnetic sensors 24, 25a, 25b is "111".

Although the MR sensor is employed as each of the magnetic sensors 24, 25a, 25b, some of the MR sensors outputs the output logic which has a reversed polarity with respect to the aforesaid example.

In this case, it is necessary to specify the using mode in correspondence to the output logic characteristics of the MR sensor to be used.

The output signals of the output logical values outputted from the magnetic sensors 24, 25a, 25b is applied to the control portion 19 shown in FIG. 1. The control portion 19 specifies the using mode of the portable terminal 10 based on the output signals from the magnetic sensors 24, 25a, 25b.

When the using mode of the portable terminal 10 is changed, the control portion 19 displays an image on the display portion 14 in a manner of changing a vertical direction and a size of the image in accordance with the specified using mode.

To be concrete, in the using mode 2 (closed state), the control portion 19 displays an image in a manner that the vertical direction of the image coincides with the longitudinal direction of the display portion 14 so that the display portion 14 of an almost rectangular shape is used in a longitudinal manner. However, the control portion displays an image by rotating 90 degree in a manner that the vertical direction of the image coincides with the short side direction of the display portion 14 in accordance with the using mode detected by the control portion 19.

For example, when using mode of the portable terminal 10 is changed from the using mode 2 to the using mode 3 while displaying an image on the display portion 14, the control portion 19 changes the vertical direction and the size of an image on the display portion 14 in accordance with the change of the using mode from the using mode 2 to the using mode 3 and displays the changed image on the display portion 14, as shown in (B) and (C) of FIG. 3.

Further, like the using modes 3 to 5 shown in (C) to (E) of FIG. 3, the control portion 19 can perform such a control that only an image is displayed entirely on the display portion 14 while not to display a remaining quantity of a battery on the display portion 14.

In the case of where the output logical values do not correspond to any of the five modes shown in FIG. 1 at the time of turning on a power supply or changing the using mode by a user, the control portion 19 of the portable terminal 20 ignores the output logical values and regards the current mode as one of the five modes shown in FIG. 1 thereby to continue the operation of the terminal.

For example, when the output logical values are abnormal, it is determined that the current mode is the mode 2 shown in FIG. 1, that is, the opened state. According to this control, even if the detection circuit such as the magnetic sensors and the magnetic materials becomes failure, since the terminal is always in the opened state, all the functions as a portable telephone are operable, so that a load of a user due to the failure of the detection circuit can be reduced.

Further, in the case where the output logical values do not correspond to any of the five modes shown in FIG. 1 when a user changes the using mode, the control portion 19 of the portable terminal 20 may ignore the output logical values and regard the current mode as one just before the change of the using mode thereby to continue at least a part of the operation of the terminal.

Accordingly, even if values different from the particular detection values are detected, the current mode is regarded as the specified state such as the closed state or the opened state and so at least a part of the display and the state can be continued. Thus, the terminal can cope with an unfinished folded state, the detection of abnormality or a failure of the magnetic sensors, for example.

Further, when the using mode is changed, the portable terminal 10 controls the change of the characteristics relating to the signal reception of the antenna 20 (see FIG. 1) so that the optimum signal receiving sensitivity can be obtained in accordance with the changed using mode.

For example, when the using mode of the portable terminal 10 is changed, the control portion 19 shown in FIG. 1 performs such a control of changing the bias voltage of a matching circuit for determining the impedance characteristics between the antenna 20 and a receiving circuit in accordance with the specified using mode.

Alternatively, when the portable terminal 10 includes a plurality of the antennas 20, the control portion performs such a control that the antenna 20 is changed into another one having a high signal receiving sensitivity in the using mode.

Further, when the using mode is changed, the portable terminal 10 activates a predetermined function in accordance with the using mode specified by the control portion 19.

For example, in the case where the predetermined function relates to the reception of television broadcast, when the change to the using mode 3 or the using mode 4 from the using mode 2 is detected, the control portion 19 activates an application for receiving the television broadcast.

Further, in the case where the predetermined function relates to the reproduction of an image, when the change to the using mode 3 or the using mode 4 from the using mode 2 is detected, the control portion 19 may activate an application for reproducing an image.

In the case where there are a plurality of the predetermined functions, the control portion 19 may select one of the functions as the function corresponding to the specified using mode and may simultaneously perform the aforesaid control of the display of the screen or the control of the antenna 20.

As explained above, the portable terminal 10 according to the embodiment of the invention is provided with the magnetic materials 21, 22a, 22b at the first casing 11 and the magnetic sensors 24, 25a, 25b at the second casing 12, whereby the using modes of the portable terminal 10 are detected by the magnetic sensors 24, 25a, 25b. Thus, the number of the members and a cost necessary for detecting the using modes of the portable terminal 10 can be reduced, and the various using modes of the portable terminal can be detected.

Further, since the portable terminal 10 is placed in the folded state or the bent state, not only the operability is improved but also the detection mechanism of the using mode can be simplified as compared with the portable terminal of the related art, whereby the light-weighting and the miniaturization of the portable terminal 10 can be realized.

Although the portable terminal 10 according to the embodiment of the invention is explained as to an example where the three magnetic materials 21, 22a, 22b and the three magnetic sensors 24, 25a, 25b are provided, the number of the magnetic materials and the number of the magnetic sensors may not be limited to three, and further the number of the magnetic materials and the number of the magnetic sensors may not be the same.

Further, the arrangement of the magnetic materials 21, 22a, 22b and the magnetic sensors 24, 25a, 25b is not limited to the one shown in FIGS. 1 and 2, and so any arrangement may be employed so long as the magnetic sensors can detect the magnetic fields of the magnetic materials thereby to specify the using mode of the portable terminal 10.

The present application is based on Japanese Patent Application (Japanese Patent Application No. 2005-2174446) filed on Jul. 27, 2005, the content of which is incorporated herein by reference.

INDUSTRIAL APPLICABILITY

The invention is suitably applied to a portable terminal which is configured so as to be foldable by coupling a first casing and a second casing via a hinge.

The invention claimed is:
1. A portable terminal comprising:
a first casing and a second casing which have inner side surfaces capable of opposing to each other, respectively; and
a hinge which has a first axis in parallel to the inner side surfaces of the first casing and the second casing and a second axis orthogonal to the first axis, and couples the first casing and the second casing, wherein
the hinge is arranged such that the first casing and the second casing are rotatable around first axis from a folded state where the inner side surfaces of the first casing and the second casing are approached to each other to an opened state where the inner side surfaces of the first casing and the second casing are separated,
in each of the folded state and a bent state in which the inner side surfaces of the first casing and the second casing are disposed in parallel to each other, the first casing and the second casing are made rotatable relatively around the second axis, wherein the portable terminal further comprises a first magnetic material, a second magnetic material and a third magnetic material which are provided at the first casing and which generate magnetic forces in parallel with the inner side surfaces; and a first magnetic sensor, a second magnetic sensor and a third magnetic sensor which are provided at the second casing so that directions of detection magnetic fields thereof are in parallel with the inner side surfaces, the first magnetic material and the first magnetic sensor are disposed at positions symmetrical with respect to the first axis, the second magnetic material and the third magnetic material, and, the second magnetic sensor and the third magnetic sensor are disposed on a circumference with a same radius around the second axis, respectively, a direction of the magnetic force generated by the second magnetic material and a direction of the magnetic force generated by the third magnetic material are orthogonal to each other, a direction of the detection magnetic field generated by the second magnetic sensor and a direction of the detection magnetic field generated by the third magnetic sensor are orthogonal to each other, when the first casing is rotated by 90 degrees around the second axis, the direction of the detection magnetic field of the second magnetic sensor coincides with the direction of the magnetic force of the second magnet material, and when the first casing is rotated by 180 degrees around the second axis, the direction of the detection magnetic field of the second magnetic sensor coincides with the direction of the magnetic force of the third magnet material and the direction of the detection magnetic field of the third magnetic sensor coincides with the direction of the magnetic force of the second magnet material.

2. A portable terminal according to claim 1, wherein one of the first casing and the second casing is provided with a display portion which displays an image and a control portion which controls the display portion, and the control portion changes a vertical direction of an image on the display portion so as to cope with the using mode thus determined.

3. A portable terminal according to claim 2, wherein in a case where the first magnetic sensor, the second magnetic sensor or the third magnetic sensor outputs values different from setting values set in advance, the control portion performs a control similar to one of the respective using modes corresponding to the setting values.

4. A portable terminal according to claim 2, wherein in a case where the first magnetic sensor, the second magnetic sensor or the third magnetic sensor outputs values different from setting values set in advance, the control portion continues at least part of a control performed just before the detection of the output values.

5. A portable terminal according to claim 2, wherein one of the first casing and the second casing is provided with an antenna, and the control portion changes characteristics relating to signal reception of the antenna in accordance with the using mode.

6. A portable terminal according to claim 1, wherein one of the first casing and the second casing is provided with a control portion which controls signal reception of television broadcast, and the control portion activates an application for receiving the television broadcast in accordance with the using mode.

7. A portable terminal according to claim 1, wherein one of the first casing and the second casing is provided with a control portion which controls reproduction of an image, and the control portion activates an application for reproducing an image in accordance with the using mode.

8. A portable terminal according to claim 1, wherein the magnetic material is a magnet.

9. A portable terminal according to claim 1, wherein the magnetic sensor is an MR sensor.

* * * * *